Feb. 22, 1949.  A. D. BLUMLEIN ET AL  2,462,599
SELF-BALANCING BRIDGE ARRANGEMENT
Filed Sept. 11, 1943

INVENTORS
ALAN DOWER BLUMLEIN, DEC'D.
BY DOREEN BLUMLEIN, EX'TRIX. &
WILLIAM HORACE CONNELL &
DENNIS GODSON HOLLOWAY

BY H. S. Grover
ATTORNEY

Patented Feb. 22, 1949

2,462,599

UNITED STATES PATENT OFFICE 2,462,599

SELF-BALANCING BRIDGE ARRANGEMENT

Alan Dower Blumlein, deceased, late of Ealing, London, England, by Doreen Blumlein, executrix, Lescudjack, Penzance, Cornwall, England, William Horace Connell, Hillingdon, and Dennis Godson Holloway, Maidenhead, England, assignors to Electric & Musical Industries Limited, Hayes, Middlesex, England, a company of Great Britain Application September 11, 1943, Serial No. 501,952
In Great Britain November 21, 1941

Section 1, Public Law 690, August 8, 1946
Patent expires November 21, 1961

5 Claims. (Cl. 323—75)

This invention relates to self-balancing bridge arrangements.

Bridge arrangements have been proposed in which in operation an out-of-balance voltage or current is developed across the bridge, and this voltage or current is caused to adjust one of the components of the bridge so as always to tend to maintain the bridge in balance.

If the component which is adjusted is of the kind in which adjustment is obtained, for example, by relative movement between two electrodes, and the relative position of these electrodes is used to indicate the value of the component being measured, the scale law of the indicator may be unsatisfactory if the characteristic, i. e. the relation between the out-of-balance voltage or current and the admittance of the adjusted component is non-linear, since for a given change of admittance the relative movement of the electrodes will not be the same at all points in the range of movement.

It is therefore desirable to control the shape of the characteristic of the adjusted component and it is the object of the present invention to provide means for effectively controlling said characteristic.

According to the present invention there is provided a self-balancing bridge arrangement in which out-of-balance voltages or currents developed in said bridge in operation are caused to adjust a balancing component so as to tend to maintain said bridge balanced, said balancing component having a non-linear characteristic including a portion of low slope and in which a further component connected in said bridge so as effectively to oppose said balancing component is arranged to be adjusted by said out-of-balance voltages or currents so that the admittances of said further and said balancing components are changed in opposite senses whereby the characteristic of said balancing component is effectively modified so as to increase the slope of said portion of low slope.

Preferably, said balancing component and said further component are constituted by the capacities between each of the fixed electrodes and the moving electrode respectively of a differential condenser, said moving electrode being arranged to be adjusted in position by said out-of-balance current or voltages.

In order that the nature of the invention may be more fully understood and readily carried into effect it will now be more fully described by way of example as applied to apparatus for indicating the height of an aircraft, with reference to the accompanying drawings, in which.

Figure 1:
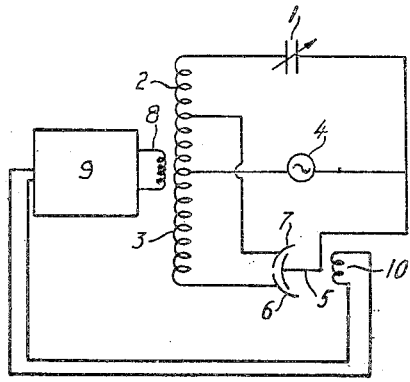
Figure 1 shows a general schematic circuit arrangement of the invention.

Referring now to Figure 1, the self-balancing bridge arrangement will be seen to be of the kind forming the subject matter of British patent application Serial No. 446,972, filed June 13, 1942, in which a capacity 1 between two electrodes (not shown), which is a function of the height of an aircraft above a conducting surface, such as the sea, is measured by means of a bridge having tightly coupled inductive ratio arms 2 and 3 and an adjustable balancing capacity. As shown in the figure, the generator 4 supplies the alternating bridge current on the one hand through the capacity 1 to be measured and the inductive ratio arm 2, and on the other hand to the balancing capacity comprising the moving electrode 5 and the two fixed electrodes 6, 7 connected respectively to the inductive ratio arm 3 and to a tapping point intermediate the ends of the inductive ratio arm 2. Out-of-balance voltages are picked up in the coupling coil 8 and after amplification by the amplifier indicated schematically by the rectangle 9 control the angular position of the electrode 5 by means of currents passing through the operating coil of a movement, such as a weak current meter movement, attached to electrode 5. The bridge arrangement thus differs from that forming the subject matter of the aforesaid application in that the automatically adjusted bridge component is in the form effectively of two condensers instead of a single condenser, and, as will now be explained, the introduction of the second balancing capacity and the adjustment of its admittances in the opposite sense to the first capacity give important advantages.

As the variation of capacity 1 with the height of the aircraft is found to be substantially exponential, it is convenient to employ as a balancing capacity a condenser which gives a substantially exponential change of capacity with deflection. Such a condenser may have a characteristic as shown by the dotted curve A in Figure 4 in which the abscissae are proportional to the distance between the electrodes and the ordinates are proportional to the capacity between the electrodes and therefore proportional to the admittances of said capacity at the bridge frequency. It will be seen that as the distance between the electrodes increases, the capacity decreases substantially exponentially, so that the relation between the height of the aircraft and the distance between the electrodes can be made substantially linear, thus giving a convenient scale law to the indicator.

A single balancing capacity having a characteristic of this kind has, however, been found to be inconvenient in practice. It will be appreciated that part of the capacity 1 between the electrodes attached to the aircraft does not vary with height and in order to increase sensitivity it has been found desirable to balance out this constant part of the capacity by means of a subsidiary capacity not controlled by out-of-balance voltages, but adjusted manually when the aircraft is at a considerable height above the earth. Thus, when this subsidiary capacity has been adjusted in these circumstances, the automatically adjusted condenser will be at a very low capacity setting with its electrodes widely separated. In these circumstances, very small changes of the capacity 1 will cause relatively large movements of the moving electrode 5, since the condenser is then operating over the right-hand portion of the characteristic shown in Figure 4 where a large movement of the moving electrode is required to effect a small change of capacity or admittance.

This condition is undesirable because small changes in capacity 1 are liable to occur due to the stressing of the aircraft structure in flight, so that even when the aircraft is flying at a constant height the moving electrode may oscillate with a relatively large amplitude and may even freeze over at one limit of its travel. Further, as the movement of the moving electrode may also be markedly asymmetrical for equal but opposite small changes of capacity, it becomes difficult to effect the desired manual adjustment of the subsidiary balancing capacity.

It is found that these difficulties can be overcome by introducing a further adjustable bridge component in such a manner that the out-of-balance voltages or currents adjust the two bridge components as to cause their admittances to change in opposite senses. Thus, referring again to Figure 4, the dotted line B shows the variation of the capacity or admittance between the electrodes 5 and 7 as the distance between these electrodes is decreased by the movement of the electrode 5 away from the electrode 6.

Due to the connection of the electrode 7 to the opposite bridge arm 2 from that to which the electrode 6 is connected the two bridge components comprising the condensers 5, 7 and 5, 6 respectively are effectively in opposition so far as the bridge is concerned. Further, as the current flowing through the admittance between the electrodes 5, 7 only flows through a portion of the arm 2, its effect upon the bridge balance is reduced and it becomes equivalent to a smaller admittance connected to the outer end of the arm 2. The admittance between electrodes 5 and 7 therefore increases negatively according to an exponential law as the admittance between electrodes 5 and 6 decreases although its maximum value is considerably less than the maximum value of the admittance between the electrodes 5 and 6. Thus, the resultant characteristic can be represented by the full line C which is the resultant of curves A and B, and it will be observed that, instead of the slope of this characteristic decreasing continuously towards a low slope at one limit as in the case of curve A, the slope of the resultant curve C continuously decreases to a given value greater than the lowest slope of curve A and thereafter increases again. Thus, the oscillations of the moving electrode above referred to are greatly reduced due to the greater slope of the characteristic C in the neighbourhood of the zero effective admittance or capacity value and also the movements of the pointer are caused to be more symmetrical.

Figure 2:
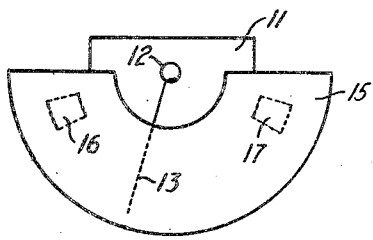
Figures 2 and 3 show an adjustable capacity for the circuit arrangement of Figure 1 in plan and in side elevation respectively.
Figure 3:
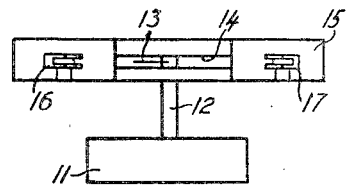

The differential condenser 5, 6, 7 shown in the circuit arrangement of Figure 1 may conveniently take the form shown in Figures 2 and 3, which is a modification of the variable condenser described in the specification of the aforesaid patent application. This variable condenser comprises a weak current meter movement shown diagrammatically at 11 and having an insulating pillar 12 fixed to the moving element of the meter 11 and carrying a light conducting pointer 13. The pointer 13 projects through the radial slot 14 in the earthed conducting structure 15 comprising two parallel conducting metal plates of the form shown in plan in Figure 2 joined together on their corresponding straight and inner semi-circular edges by means of a conducting metal strip containing the radial slot 14. Two electrodes 16, 17, each in the form of a small slotted rectangular block, are supported in an insulated manner within the structure 15, the slot in each electrode being so shaped and positioned that the moving pointer 13 can enter it without electrical contact with the electrode. The provision of these slots avoids the possibility of metallic contact between the moving electrode 13 and either of the fixed electrodes 16 or 17 which might disturb the bridge arrangement and give rise to "hunting." This variable condenser will be seen to differ from that shown in the specification of the aforesaid application chiefly due to the fact that two fixed electrodes are provided instead of one and, as explained in the aforementioned specification, the shape of the characteristic may be modified by varying the spacing between the members of the earthed structure 15, as, for example, by the provision of slots to permit suitable distortion of these plates.

Figure 4:
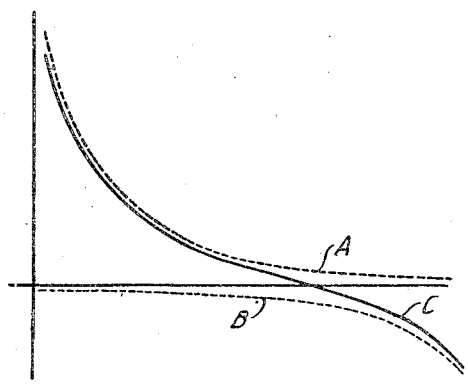
Figure 4 shows the variation of capacity with the angular position of the moving electrode of the variable capacity shown in Figures 2 and 3.

Although the capacities between the moving electrode 13 and each of the fixed electrodes 16, 17, respectively, are similar, they can be made effectively dissimilar in order to give characteristics comparable to A and B as shown in Figure 4 by feeding bridge voltages of different amplitudes to the electrodes 6, 7, or alternatively, feeding the bridge currents to the moving electrode 5 and passing the currents received by the electrodes 6, 7, through different numbers of turns of the ratio arms of the bridge. Thus, if an adjustable condenser of the kind shown in Figures 2 and 3 is used in the circuit arrangement of Figure 1, the fixed electrode 7 may be connected to a tapping in the inductive ratio arm 2, such that the bridge current flowing from the electrode 7 only passes through $\frac{1}{10}$ as many turns on the ratio arm 2 as the number of turns in the ratio arm 3 through which flows the bridge current from electrode 6.

Alternatively, the effectiveness of the capacity between the electrode 5 and 6 or 7 may be controlled by introducing a capacity potentiometer between the electrode and the bridge so that only a fraction of the current reaching the electrode 6 or 7 flows into the appropriate ratio arm of the bridge. Further, the bridge voltage applied to the moving electrode 5 need not be the same as that applied to the capacity I to be measured and may be reduced to any desired extent, for example, by means of a step-down transformer or a capacity potentiometer.

If desired, the electrodes 16, 17 may be made different in size so as to give the desired different variations of capacity or admittance without requiring the application of different bridge voltages or the use of different tappings on the ratio arms of the bridge.

It will be understood that although in the arrangement above referred to the two adjustable components of the bridge have taken the form of a single differential condenser, separate components may be used provided that they are arranged to be controlled by the out-of-balance voltages or currents so as to adjust the admittances of the separate components in opposite senses. Further, if desired, one or more of the adjustable components may be variable inductances or resistances, the nature of the element being chosen to be appropriate to the nature of the components to be measured.

It will be appreciated that, as is usual with alternating current bridges, auto-transformer couplings may be replaced by transformer couplings and the source of bridge current and the source of out-of-balance voltage may be interchanged. Although the invention has been described with reference to a self-balancing bridge arrangement embodied in a height indicator, it will be appreciated that it is generally applicable to self-adjusting bridges for the measurement and indication of any electrical impedances.

What we claim is:

1. An electric bridge including a fixed ratio arm consisting of two elements and a variable ratio arm consisting of two variable elements, said fixed ratio arm being connected to said variable ratio arm to form said electric bridge, and a variable element connected to said fixed ratio arm at a point intermediate its terminals and to said variable ratio arm and being variable in synchronism with one of said variable elements to alter its rate of variation.

2. An electric bridge including a fixed ratio arm consisting of two inductors and a variable ratio arm consisting of two variable condensers, said fixed ratio arm being connected to said variable ratio arm to form said electric bridge, and a third variable condenser connected to said fixed ratio arm at a point providing a different fixed ratio and to said variable ratio arm.

3. An electric bridge including a fixed ratio arm consisting of two inductors and a variable ratio arm consisting of two variable condensers, said fixed ratio arm being connected to said variable ratio arm to form said electric bridge, and a third variable condenser connected to said fixed ratio arm at a point providing a different fixed ratio and to said variable ratio arm, said third variable condenser being variable in synchronism with one of the variable condensers of said variable ratio arm to alter its rate of variation.

4. A self-balancing bridge arrangement in which out-of-balance voltages or currents developed in said bridge in operation are caused to adjust a balancing component so as to tend to maintain said bridge balanced, including in combination a pair of fixed arms, a first adjustable arm having a non-linear characteristic including a portion of low slope and a second adjustable arm effectively connected to said first adjustable arm and to a point on said fixed arms and connected to oppose said balancing component and means operated in response to said out-of-balance voltages or currents, and effectively coupled to said adjustable arms so that the admittances of said first and second adjustable arms are changed in opposite senses and at different rates for equal changes in said adjustable arms whereby the characteristic of said balancing component is effectively modified so as to increase the slope of said portion of low slope.

5. A self-balancing bridge arrangement according to claim 4, in which said characteristic is substantially exponential with said portion of lower slope at one limit thereof, the first and second adjustable arms being relatively disposed and connected so that as the admittance of one of said adjustable arms decreases exponentially the admittance of the other of said adjustable arms increases exponentially and vice versa.

DOREEN BLUMLEIN,
*Executrix of Alan Dower Blumlein, Deceased.*
WILLIAM HORACE CONNELL.
DENNIS GODSON HOLLOWAY.

REFERENCES CITED

The following references are of record in the file of this patent:

UNITED STATES PATENTS

| Number | Name | Date |
|---|---|---|
| 2,004,613 | Meacham | June 11, 1935 |
| 2,106,556 | Petersen | Jan. 25, 1938 |
| 2,280,725 | Shepard | Apr. 21, 1942 |
| 2,309,490 | Young | Jan. 26, 1943 |

FOREIGN PATENTS

| Number | Country | Date |
|---|---|---|
| 441,576 | Great Britain | Jan. 22, 1936 |

OTHER REFERENCES

Alternating Current Bridge Methods, by Hague, 4th ed., 1938, pages 340–344.